United States Patent
Foote et al.

(10) Patent No.: US 7,027,124 B2
(45) Date of Patent: Apr. 11, 2006

(54) METHOD FOR AUTOMATICALLY PRODUCING MUSIC VIDEOS

(75) Inventors: Jonathan Foote, Menlo Park, CA (US); Matthew Cooper, San Jose, CA (US); Andreas Girgensohn, Menlo Park, CA (US); Shingo Uchihashi, Cupertino, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 54 days.

(21) Appl. No.: 10/086,795

(22) Filed: Feb. 28, 2002

(65) Prior Publication Data

US 2003/0160944 A1   Aug. 28, 2003

(51) Int. Cl.
*G03B 31/00* (2006.01)
*H04N 9/475* (2006.01)

(52) U.S. Cl. .......................... 352/1; 348/515
(58) Field of Classification Search .............. 352/1; 348/722, 738, 515; 382/170, 173; 386/52, 386/95, 96
See application file for complete search history.

(56) References Cited

U.S. PATENT DOCUMENTS

| | | | |
|---|---|---|---|
| 4,491,879 A * | 1/1985 | Fine ............................ | 386/96 |
| 5,969,716 A | 10/1999 | Davis et al. ................. | 345/328 |
| 6,067,126 A * | 5/2000 | Alexander ................... | 348/738 |
| 6,243,087 B1 | 6/2001 | Davis et al. ................. | 345/328 |
| 6,320,598 B1 | 11/2001 | Davis et al. ................. | 345/648 |
| 6,353,461 B1 * | 3/2002 | Shore et al. ................. | 348/722 |
| 2002/0191107 A1 * | 12/2002 | Hu et al. ..................... | 348/515 |

OTHER PUBLICATIONS

Kuchinsky, et al., "Fotofile: A Consumer Multimedia Organization and Retrieval System," *CHI*, May 15-20, 1999, pp. 496-503.
Boreczky, et al., "Comparison of Video Shot Boundary Detection Techniques," pp. 1-10.
Uchihashi, et al.; "Summarizing Video Using a Shot Importance Measure and a Frame-Packing Algorithm," pp. 1-14.
Scheirer, "Tempo and Beat Analysis of Acoustic Musical Signals," *Acoustical Society of America*, vol. 103, Jan. 1, 1998, pp. 588-601.
Lienhart, "Abstracting Home Video Automatically," pp. 1-10.
Smith, et al., "Video Skimming and Characterization through the Combination of Image and Language Understanding Techniques," pp. 1-14.
Suzuki, et al., "Multimedia Montage-Counterpoint Synthesis of Movies," pp. 1-6.

(Continued)

*Primary Examiner*—Rodney Fuller
(74) *Attorney, Agent, or Firm*—Fliesler Meyer LLP

(57) ABSTRACT

Music videos are automatically produced from source audio and video signals. The music video contains edited portions of the video signal synchronized with the audio signal. An embodiment detects transition points in the audio signal and the video signal. The transition points are used to align in time the video and audio signals. The video signal is edited according to its alignment with the audio signal. The resulting edited video signal is merged with the audio signal to form a music video.

23 Claims, 8 Drawing Sheets

OTHER PUBLICATIONS

Effelsberg, et al., "Generating Video Abstracts Automatically," pp. 1-8.

Christel, et al., "Evolving Video Skims into Useful Multimedia Abstractions," pp. 1-9.

Goto, et al., "Real-Time Rhythm Tracking for Drumless Audio Signals—Chord Change Detection for Musical Decisions," *IJCAI-97 Workshop on Computational Auditory Scene Analysis*, pp. 135-144.

Lienhart, et al., "Video Abstracting," *Communications of ACM* Dec. 1997, pp. 1-12.

Cooper, et al., "Scene Boundary Detection Via VideoSelf-Similarity Analysis," pp. 1-4.

Mastaka Goto, Yoichi Muraoka; "A Beat Tracking System for Acoustic Signals of Music," Association of Computing Machinery, Multimedia 94-Oct. 1994 San Francisco, CA, USA, pp. 365-372 © 1994 ACM 0-89791-686-7/94/00.10.

Silvia Pfeiffer, Rainer Lienhart, Stephan Fischer and Wolfgand Effelsberg, "Abstracting Digital Movies Automatically," Praktische Informatik IV, University of Mannheim, D-68131 Mannheim, pp. 1-14, May 1996.

David Sankoff, Joseph Kruskal; "Time Warps, String Edits, and Macromolecules The theory and Practice of Sequence Comparison," David Humes Series, CSLI Publications, Center for the Study of Language and Information, Leland Stanford Junior University, pp. 265-310, © 1999.

* cited by examiner

METHOD FOR AUTOMATICALLY PRODUCING MUSIC VIDEOS

FIELD OF THE INVENTION

The invention relates to a method for automatically producing music videos from a source video and an unrelated audio source.

BACKGROUND OF THE INVENTION

Widespread proliferation of personal video cameras has resulted in an astronomical amount of uncompelling home video. Many personal video camera owners accumulate a large collection of videos documenting important personal or family events. Despite their sentimental value, these videos are too tedious to watch. There are several factors detracting from the watchability of home videos.

First, many home videos are comprised of extended periods of inactivity or uninteresting activity, with a small amount of interesting video. For example, a parent videotaping a child's soccer game will record several minutes of interesting video where their own child makes a crucial play, for example scoring a goal, and hours of relatively uninteresting gameplay. The disproportionately large amount of uninteresting footage discourages parents from watching their videos on a regular basis. For acquaintances and distant relatives of the parents, the disproportionate amount of uninteresting video is unbearable.

Second, the poor sound quality of many home videos exacerbates the associated tedium. Well-produced home video will appear amateurish without professional sound recording and post-production. Further, studies have shown that poor sound quality degrades the perceived video image quality. In W. R. Neuman, "Beyond HDTV: Exploring Subjective Responses to Very High Definition Television," MIT Media Laboratory Report, July 1990, listeners judged identical video clips to be of higher quality when accompanied by higher-fidelity audio or a musical soundtrack.

Thus, it is desirable to condense large amounts of uninteresting video into a short video summary. Tools for editing video are well known in the art. Unfortunately, the sophistication of these tools make it difficult to use for the average home video producer. Further, even simplified tools require extensive creative input by the user in order to precisely select and arrange the portions of video of interest. The time and effort required to provide the creative input necessary to produce a professional looking video summary discourages the average home video producer.

In order to relieve the burden of editing video, many techniques have been proposed for automatically creating video summaries. However, these techniques are unsuitable for home video. In Christel, M., Smith, M., Taylor, C., and Winkler, D., "Evolving Video Skims into Useful Multimedia Abstractions," Human Factors in Computing Systems, CHI 98 Conference Proceedings (Los Angeles, Calif.), New York: ACM, pp. 171–178, 1998; Pfeiffer, S., Lienhart, R., Fischer, S., and Effelsberg, W., "Abstracting Digital Movies Automatically," Journal of Visual Communication and Image Representation, 7(4), pp. 345–353, December 1996; and Smith, M., and Kanade, T., "Video Skimming and Characterization through the Combination of Image and Language Understanding Techniques," Proc. ComputerVision and Pattern Recognition, pp. 775–781, 1997, a text transcription of the video is used to determine video segments for video summaries. In home video, text transcription is normally unavailable.

Lienhart, R., "Abstracting Home Video Automatically," Proc. ACM Multimedia '99(Part2), pp.37–40, 1999, creates video digests by selecting portions of video shots with good quality and concatenating the selected portions. Audio considerations are not addressed.

In Suzuki, R. and Iwadate, Y., "Multimedia Montage—Counterpoint Synthesis of Movies," Proc. IEEE Multimedia Systems '99, Vol. 1, pp. 433–438, 1999, the authors describe video editing tools for composing movies using heuristics derived from music theory. With these video editing tools, the resulting footage is well synchronized with sound. However, these video tools do not operate automatically; the user must manually edit the video.

It is desirable to have a method for producing video summaries that 1) accurately and concisely summarizes a longer video recording; 2) provides a compelling video presentation; 3) produces a professional looking video presentation; 4) reduces or eliminates the detrimental effects of poor quality audio; and 5) produces a video summary automatically, with little or no user input required.

SUMMARY OF THE INVENTION

According to the invention, generally, a method for automatically producing music videos is comprised of receiving an audio signal and a video signal and producing a video presentation synchronized with the received audio signal. In an embodiment, the method detects transition points in the audio signal and the video signal. The transition points are used to align in time portions of the video signal with the audio signal. In an embodiment, dynamic programming is used to align the transition points of the audio and video signals. Alternatively, tempo detection or peak picking may be used for alignment. The video signal is edited according to its alignment with the audio signal. The resulting edited video signal is merged with the audio signal to form a music video.

In an embodiment, transition points in the video signal define a set of video segments. Similarly, transition points in the audio signal define a set of audio segments. The method then aligns the audio and video segments. The video segments are truncated in order to equal the length of their corresponding audio segments. Alternatively, a portion of the video segment equal to the length of the corresponding audio segment is selected using a suitability measurement.

In an embodiment, transition points are detected by parameterizing the audio and video signals to form corresponding sets of feature vectors. The sets of feature vectors are evaluated in order to determine the location of transition points in the audio and video signals. In an embodiment, the method evaluates a set of feature vectors by constructing a self-similarity matrix based upon a distance metric for a set of feature vectors. This embodiment of the method detects transition points by extracting a structure from the self-similarity matrix via a kernel correlation.

In a further embodiment, a user may designate portions of the video signal for inclusion in the resulting music video. A graphical user interface may facilitate the designation. The method automatically produces a music video from at least the designated portions of the video signal and an audio signal.

SUMMARY OF THE FIGURES

The present invention will be described with reference to the drawings, in which.

DETAILED DESCRIPTION

Figure 1:
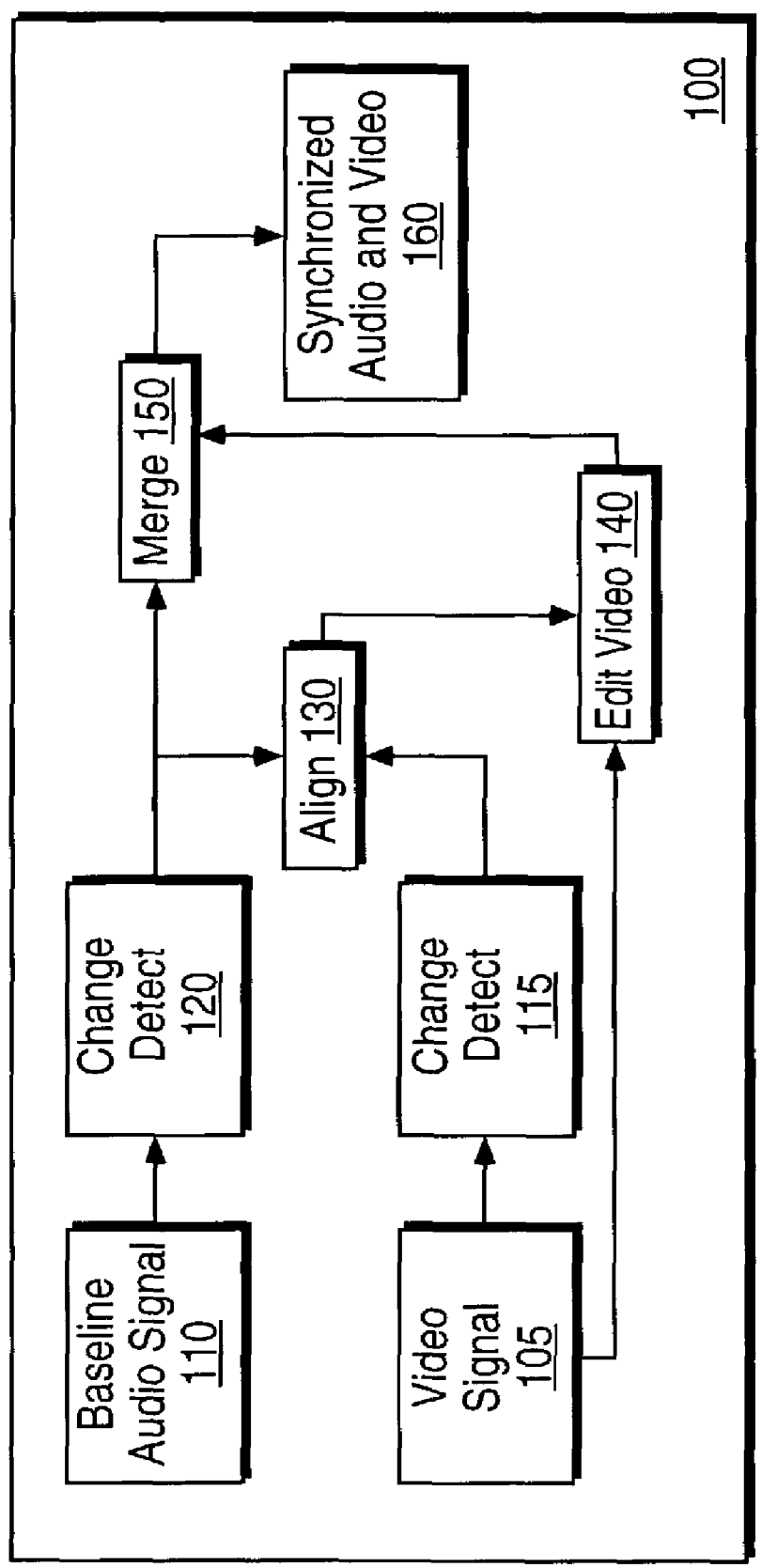
FIG. 1 illustrates a block diagram of an embodiment of the method of the present invention.

The invention addresses the shortcomings associated with other methods of producing video summaries. In particular, the invention is suitable for producing video summaries of home videos. The invention achieve these goals by providing a method for automatically condensing long home videos into a compelling and concise music video. A music video presents many video clips synchronized to a short, unrelated audio track. In the present invention, the music video summarizes the source video footage and is synchronized to music chosen by the user.

The use of the music video format for video summaries provides several advantages. First, in comparison to the average home video, most popular music is short in duration, lasting typically 3 minutes. For most people, the approximately 3 minute duration of a popular song is an ideal length for presenting home videos. This provides sufficient time to show the most interesting moments from a home video without testing the patience of the audience. Although relatively short music videos are often desirable, it should be noted that the method of the present invention is adept at producing music videos with music of any length.

Additionally, the music video format helps provide a compelling video presentation. Music often has an emotional impact on the listener. By linking the most interesting portions of a home video with the appropriate music, the emotional impact of the overall presentation is greatly enhanced.

Music videos also give video summaries a professional appearance. Music videos synchronize video and audio events. In Lipscomb, S. D., "Perceptual Measures of Visual and Auditory Cues in Film Music," JASA 101(5, ii), p. 3190; and Lipscomb, S. D., and Kendall, R. A., "Perceptual Judgement of the Relationship Between Musical and Visual Components in Film," Psychomusicology, 13(1), pp. 60–98, (1994), it has been shown that viewers rate the "effectiveness" of a video clip higher when it is synchronized with an audio track. Additionally, synchronizing audio and video events is a technique widely employed by cinematic sound editors. By creating video summaries that synchronize audio and video events, the overall presentation more closely resembles professionally produced counterparts.

Music videos reduce the detrimental effects of poor quality audio. By substituting a professionally produced sound recording for the original, poor quality soundtrack associated with most home video recordings, the perceived quality of the video is enhanced.

Further, unlike other methods of creating video summaries, the method of the present invention requires little or no user input to create the music video. In an embodiment, the method only requires the user to supply the original video footage and the music chosen to accompany the video summary. An alternate embodiment allows the user to further input the desired number of video shots in the final music video. In an alternate embodiment, the user can designate one or more portions of the source video to be included in the final source video. This can be done with a graphical user interface.

FIG. 1 illustrates an embodiment of the method of the present invention in block diagram 100. A video signal is input into the method at block 105. The video signal is used as a source for video footage to create the music video. In an embodiment, the source video is input into the method as a digital video data file in a standard format. One standard format for digital video is the DV video format. Other digital video formats may be easily adapted to the present invention. The digital video file may be stored on a local digital information storage medium, or alternatively, stored on a remote digital information storage medium accessible via a local or wide area computer network.

In an alternate embodiment, an analog video signal may be input into the method at block 105. In this embodiment, the block 105 includes hardware and/or software for converting the analog video signal into a digital video signal and storing the digital video data. The video may be input into the method as an analog video signal and converted into a digital video data file. The digital video file may be stored on a local digital information storage medium, or alternatively, stored on a remote digital information storage medium accessible via a local or wide area computer network.

In an embodiment, the video signal includes a related audio soundtrack. The audio soundtrack contains audio information related to the video signal. In an embodiment, the audio soundtrack is recorded simultaneously with the video signal. As an example, the audio soundtrack may contain dialogue or other sounds associated with the events visually recorded by the video signal. In an embodiment of the method, the audio soundtrack is discarded by the method for the final music video soundtrack. In an alternate embodiment, discussed in detail below, the audio soundtrack is completely or selectively mixed into the final music video soundtrack.

A baseline audio signal, typically a musical soundtrack, is input into the method at block 110. The baseline audio signal does not need to be related to the video signal in any way. To avoid confusion with the related audio soundtrack (if any), the unrelated audio signal is referred to as the baseline audio signal. The baseline audio signal provides a framework for editing and aligning the video signal. Additionally, the baseline audio signal is used by the method as a soundtrack for the resulting music video. In an embodiment, the baseline audio signal is a popular song or musical piece chosen by the user.

The baseline audio is input into an embodiment of the method as a digital audio file. A common format for digital audio is the MPEG-1, Layer 3 (MP3) format. Other digital audio formats may be easily adapted to the present invention. In an alternate embodiment, the baseline audio may be input into the method as an analog audio signal and converted into a digital audio data file. In this embodiment, the block 110 includes hardware and/or software for converting the analog video signal into a digital video signal and storing the digital video data. In either embodiment, the digital audio file may be stored on a local digital information storage medium, or alternatively, stored on a remote digital information storage medium accessible via a local or wide area computer network.

Following the input of the video signal at block 105, the method detects changes in the video signal at block 115. The locations of large changes in the video signal are used as potential shot boundaries for alignment with the baseline audio signal and editing into the final music video. There are two steps in change detection. First, the video signal is parameterized. Second, the parameterized video is evaluated to detect changes from frame to frame.

Common types of video parameterization and evaluation include frame-to-frame pixel difference, color histogram difference, and low order discrete cosine coefficient (DCT) difference. In an embodiment, video is parameterized by sampling every 10th frame of video. Each frame may be sampled discretely, or an average of the 10 frames may be used to avoid aliasing. Each frame is converted from the standard red-green-blue color space to the Ohta color space, which is defined by the transform:

$$\begin{bmatrix} o_1 \\ o_2 \\ o_3 \end{bmatrix} = \begin{bmatrix} 1 & 1 & 1 \\ 1 & 0 & -1 \\ 1 & -2 & 1 \end{bmatrix} \begin{bmatrix} r \\ g \\ b \end{bmatrix}$$

The discrete cosine transform of each channel $o_1$, $o_2$, $o_3$ is computed, and a feature vector is formed by concatenating the resulting low frequency coefficients of the three channels. This results in a low-dimensional feature vector for every 10 frames. In an alternate embodiment, a color histogram associated with a frame is used as a feature vector. The difference in feature vectors between each sampled frame is used to detect the changes in the video signal.

Similarly, block 120 detects changes in the baseline audio signal. The baseline audio is first parameterized and then evaluated to determine changes. The baseline audio signal may be parameterized by any standard spectral parameterization. In an embodiment, the baseline audio is parameterized based on a short-term Fourier transform (STFT). Audio is first converted to a monophonic representation at a $F_s$=22.05 kHz sampling rate. This is analyzed in short frames of 1024 samples, spaced at roughly 1/10 second intervals (2,205 samples), discarding roughly half of the audio data. The discrete Fourier transform of each window is taken, and the log of the magnitude is calculated. The resulting power spectrum is quantized into 30 bins evenly spaced from 0 to $F_s/4$ Hz. This results in a 30 dimensional feature vector at a 10 Hz frame rate. Other types of audio parameterization may be employed, with different sampling rates, transforms, window sizes, or quantization bins. Mel-scaled bins or cepstral coefficients may also be employed successfully.

Once the audio signal has been parameterized, the difference between audio frames is used to detect changes in the audio signal. In an embodiment, self-similarity analysis is used to evaluate changes in the parameterized audio signal. A further embodiment employs self-similarity analysis to detect changes in the parameterized audio signal and the parameterized video signal. Self-similarity analysis is described in J. Foote, "Automatic Audio Segmentation using a Measure of Audio Novelty." In Proc. IEEE International Conference on Multimedia and Expo (ICME) 2000, vol. I, pp.452–455, New York, N.Y., August 2000, and in J. Foote and S. Uchihashi, "The Beat Spectrum: A New Approach to Rhythm Analysis," in Proc. IEEE International Conference on Multimedia and Expo (ICME) 2001, Tokyo, August 2001, both of which are incorporated by reference herein.

Figure 2:
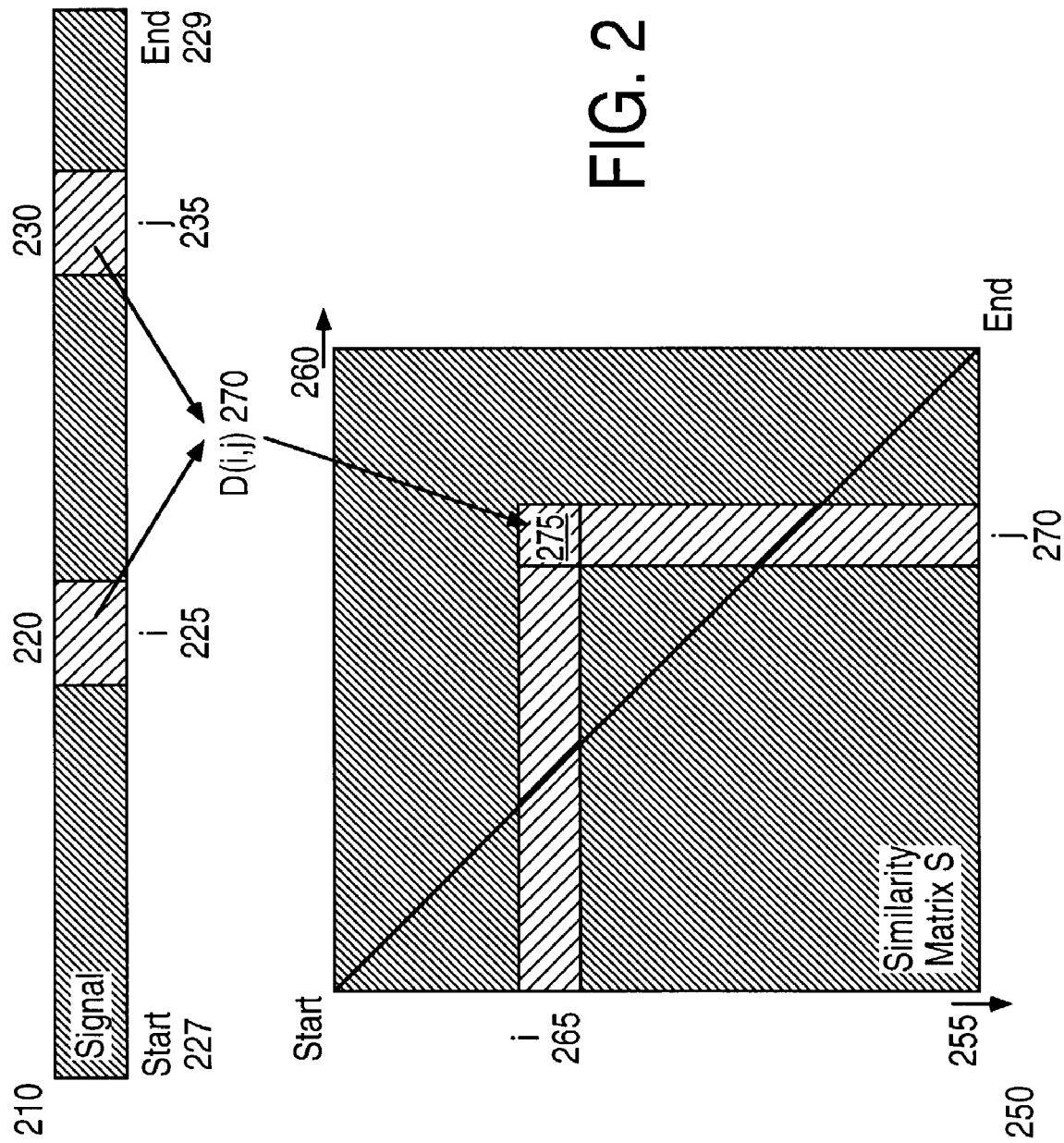
FIG. 2 illustrates a method for detecting transition points in a video or audio signal according to an embodiment of the present invention.

FIG. 2 shows the construction of a similarity matrix used for self-similarity analysis of audio and/or video. The parameterized signal 210 arranges the feature vectors in order of their associated frames. Feature vector 220 is the parameterized frame located at signal time (i) 225. Feature vector 230 is the parameterized framed located at signal time (j) 235. The value of signal times (i) 225 and (j) 230 can vary from the start of the parameterized signal 227 to the end of the parameterized signal 229.

The key to the self-similarity analysis is the measure of the similarity 270 (D) of feature vectors 220 and 230. One simple measure of similarity 270 is the Euclidean distance between the feature vectors calculated in parameter space. In an alternate embodiment, similarity 270 is the cosine of the angle between the feature vectors. This similarity 270 between two feature vectors may be calculated in the standard manner for computing the cosine of the angle between two vectors, such as $$D_c = \frac{v_i \cdot v_j}{\|v_i\| \|v_j\|}$$

where $v_i$ is feature vector 220 and $v_j$ is feature vector 230. This measure of similarity yields a large similarity score even if the feature vectors are small in magnitude. This is advantageous in that relatively similar regions of low energy are judged just as similar as relatively similar regions of high energy. In an alternate embodiment, subtracting the overall mean from each feature vector produces a more pronounced similarity score. In an alternate embodiment, the similarity 270 is the Karhunen-Loeve distance between feature vectors.

The similarity 270 between every instant in a signal is represented by square matrix 250. Matrix 250 contains the similarity 270 computed for all combinations of frames in parameterized signal 210. In matrix 250, the horizontal axis 260 represents all values of signal time (j). Vertical axis 255 represents all values of signal time (i). Vertical axis position 265 corresponds to signal time (i) 225, and horizontal axis position 270 corresponds to signal time (j)230. Matrix element 275 is located at the intersection of positions 265 and 270. The value of matrix element 275 is the similarity measure 270 computed between feature vector 220 at signal time (i) 225 and feature vector 230 at signal time (j) 235. This computation of similarity is computed for all elements of matrix 250.

Figure 3:
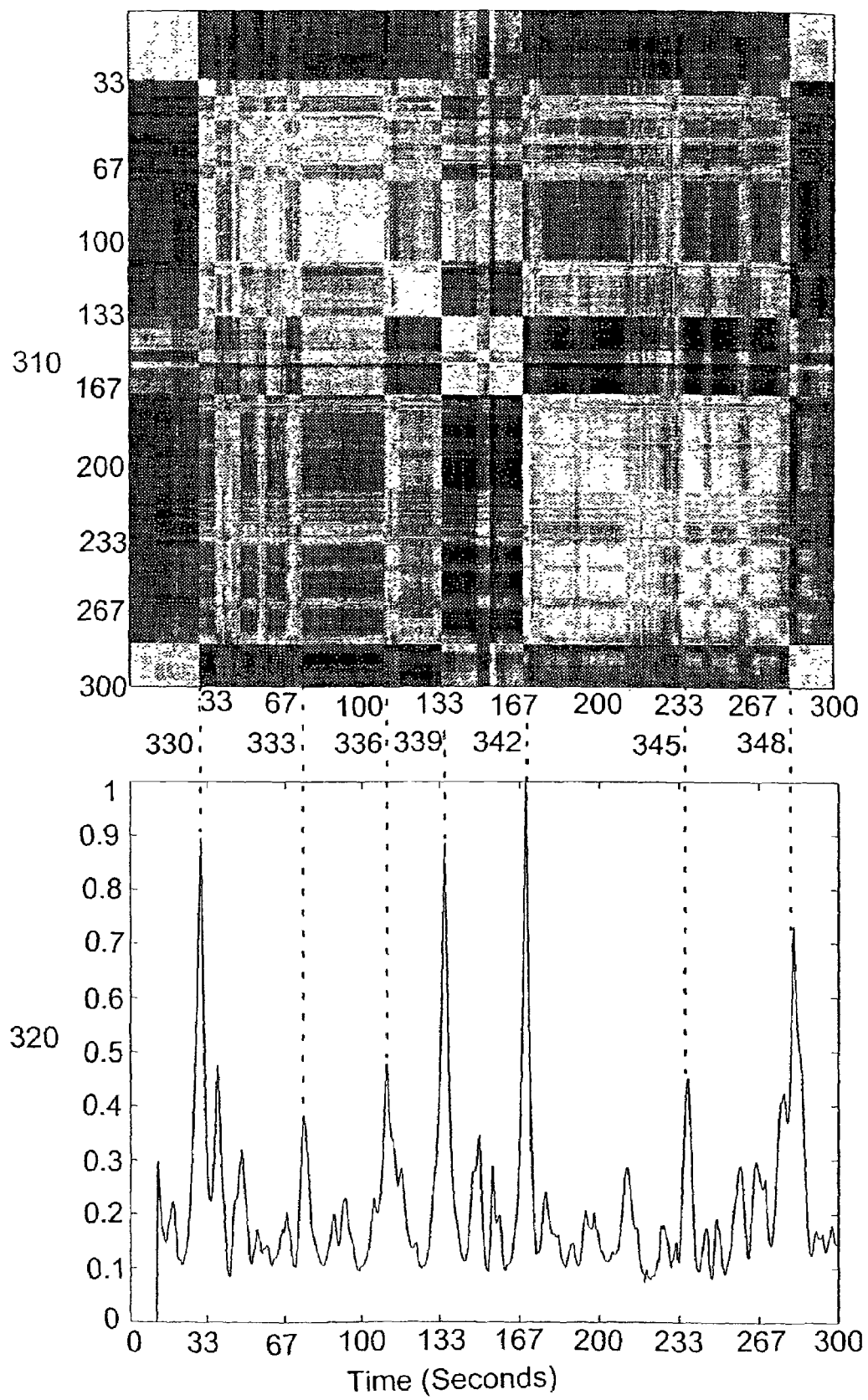
FIG. 3 illustrates a method for detecting transition points in a video signal according to an embodiment of the present invention.

FIG. 3 shows the detection of transition points in a video or audio signal using a similarity matrix. Graph 310 is a visualization of a similarity matrix for a sample of video. Each element of graph 310 is shaded with a gray scale value proportional to the similarity value of the element. Bright areas represent high similarity, and dark areas represent low similarity. Since the main diagonal represents a comparison of a feature vector with itself, the main diagonal of the similarity matrix is clearly visible as a white line (every feature vector is maximally similar to itself). Areas of high similarity, such as audio silence or a static video image, appear as bright squares on the diagonal. Repeated audio sounds or video shots are visible as bright off-diagonal rectangles. If the audio or video has a high degree of repetition, this will be visible as diagonal stripes or checkerboards, offset from the main diagonal by the repetition time. As can seen from graph 310, shot transitions produce a distinctive "checkerboard" pattern.

Transition points in the parameterized signal are extracted by looking for the checkerboard patterns in the similarity matrix. This is accomplished by correlating the similarity matrix with a kernel that looks like a checkerboard. In an embodiment, the kernel (C) is a 2×2 matrix with the value:

$$C = \begin{bmatrix} 1 & -1 \\ -1 & 1 \end{bmatrix}$$

Alternate embodiments may use larger kernels which are smoothed to avoid edge effects by tapering towards zero at the edges. For example, a 64×64 checkerboard kernel with a radial Gaussian taper having $\delta=32$ may be used.

Correlating a checkerboard kernel along the diagonal of a similarity matrix results in a measure of novelty. This can be visualized as sliding kernel C along the diagonal of a similarity matrix, for example graph 310, and summing the element by element product of C and the portion of the similarity matrix covered by C at a particular position. Mathematically, novelty can be expressed by N(i), where i is the frame number of the parameterized signal, by the expression:

$$N(i) = \sum_{m=-L/2}^{L/2} \sum_{n=-L/2}^{L/2} C(m,n) S(i+m, i+n)$$

In this expression, S is the similarity matrix for a given parameterized signal, and L is the width or lag of the kernel. In an embodiment, for computation of N(i), S can be zero-padded to avoid undefined values at the edges of similarity matrix S. Alternatively, N(i) can only be computed for the interior of the parameterized signal where the kernel C completely overlaps the similarity matrix. In an additional embodiment, similarity matrix S and kernel C are symmetrical about the main diagonal, so that only half of the double summation values need to be computed.

Chart 320 plots the values of an embodiment of the calculation of N(i) for the example similarity matrix graph 310. In this embodiment, a 71×71 kernel was used, corresponding to a kernel width of 23.66 seconds. Large peaks in the graph represent transition points in the parameterized signal. In Chart 320, peaks 330, 333, 336, 339, 342, 345, and 348 have been annotated with dotted lines illustrating the corresponding times in example similarity matrix 310.

The width L of the kernel directly affects the properties of the novelty measure N(i). A small kernel detects novelty on a short time scale. Conversely, a large kernel will tend to average out short-time novelty and detect longer shots and structure. In an embodiment, the kernel size is tailored to music video creation. In music videos, a minimum shot length of a few seconds is preferred. Therefore, kernels of this length are employed to detect transition points.

In an alternate embodiment, transition points in the parameterized audio or video signals are detected by measuring the accumulated changes between a feature vector and a set of previous feature vectors. In an alternate embodiment, heuristics are used to further improve the detection of transition points. An example of a heuristic is using a video shot time limit for the detection of changes in the video signal. In this example, the change detection is influenced by the differences between feature vectors and by the time period between a feature vector and a previously detected change.

Figure 4:
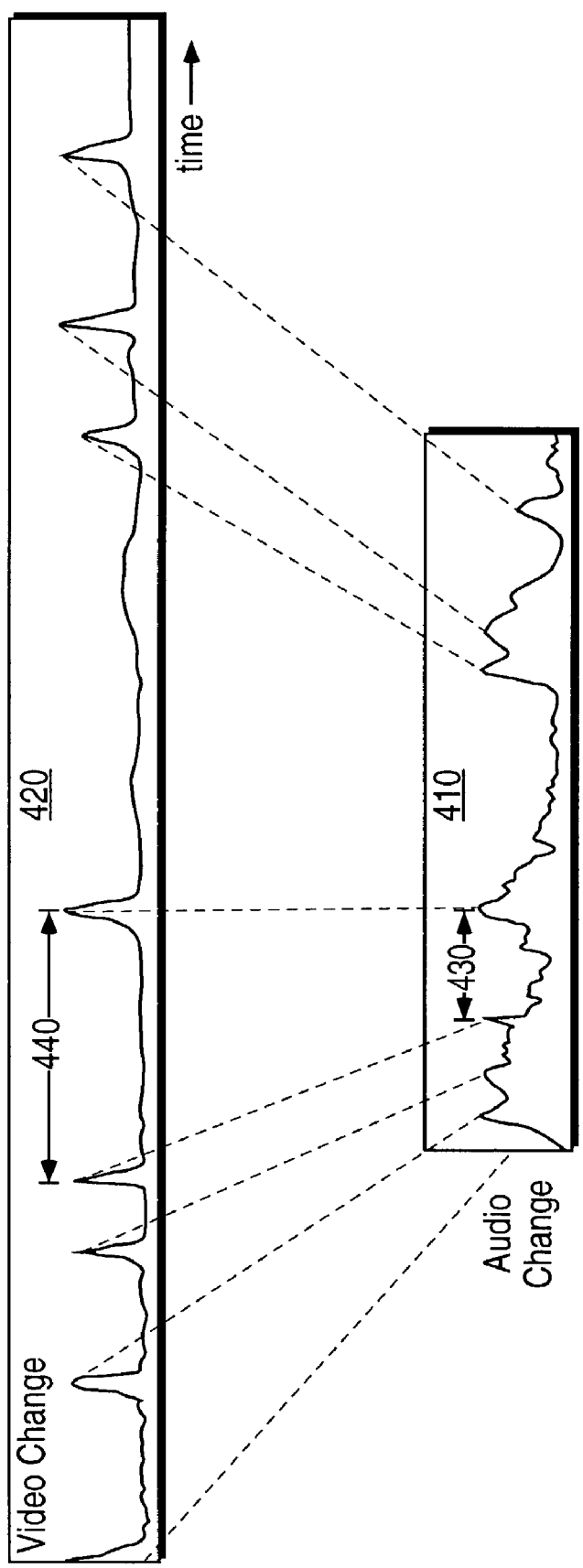
FIG. 4 illustrates a method for automatically synchronizing transition points in the video and audio signals according to an embodiment of the present invention.

Returning to FIG. 1, once transition points have been detected in both the baseline audio and video signals, the two separate signals are aligned in block 130. FIG. 4 shows an example of the novelty measure N(i) for both a video signal 420 and a baseline audio signal 410. The novelty measure for the baseline audio signal and video signal may be computed using self-similarity analysis, as discussed above, or in an alternate embodiment by computing the difference between frames of the parameterized signal.

In FIG. 4, the peaks of the baseline audio and video signals represent transition points in the respective signal. For the video, these peaks represent the boundaries between shots where the video will be cut. For the audio, these peaks represent changes in the music where the video will be synchronized. In an embodiment of the method of the present invention, this is done by aligning the peaks of the video with the peaks of the baseline audio.

The spacing between consecutive peaks define a particular segment of video or baseline audio. In the example of FIG. 4, video segment 440 is to be aligned with baseline audio segment 430. In this example, video segment 440 is longer than corresponding audio segment 430. In an embodiment, the method truncates the video segment to fit within the audio segment. If the video segment is shorter than the audio segment, an embodiment of the method repeats a portion of the video to fill in the remainder of the audio segment.

Rather than blindly truncating the video from the end of video segment, in an alternate embodiment, a suitability measurement is used to choose the portion of the video segment for alignment with the audio segment when the video segment is longer than the corresponding audio segment. For the suitability measurement, a video window equal to the length of the audio segment is slid over the length of the video segment. A suitability measurement is computed for the video signal within the video window. This calculation is repeated for each position of the video window. The video window with the highest suitability measurement is selected for alignment with the audio segment; the portion of the video segment outside of the selected video window is removed.

Examples of types of suitability measurements include quantitative measurements of camera motion, color, image quality, and face detection; although any type of quantitative video or image measurement may be employed as a suitability measurement.

In rare cases, a selected video segment may be shorter than the aligned audio segment. This is referred to as shot collision. Shot collision can be resolved through several heuristics. First, shots of insufficient length can be automatically discarded in favor of longer shots. Second, the current video segment may be overlapped so that video segment is extended in length into the next video segment, and then restarted at the desired alignment point for the next video segment. Third, the video segment may be altered to fit the audio segment, either by slowing the video segment down, showing frames as stills, or inserting a title or graphic.

Fourth, the audio time scale may be changed. Because this will change the musical tempo, this is only suitable for very small changes.

Often, there will be an unequal amount of peaks in the novelty measurements of the video and baseline audio signals. Further, there may be many more peaks than the desired number of shots in the final music video. Thus, it is necessary to choose which video peak should be aligned with a particular audio peak, or vice versa. Methods of aligning audio and video peaks include Dynamic Programming, Peak Alignment, and Tempo Mapping.

In an embodiment, the respective peaks of the video and baseline audio are aligned using Dynamic Programming. Dynamic Programming is a technique used to compute the best alignment of one sequence with another. In this embodiment, the novelty measurements N(i) of the video and baseline audio signals are normalized and each are reduced to a string representation. The regions representing peaks are set to 1, while non-peak regions are set to 0. Thus, the novelty measurements for the audio and video signals are each reduced to a string of ones and zeros.

A table is then constructed with a first string, S1, for example the baseline audio, along the horizontal axis, and a second string, S2, for example the video, along the vertical axis. In this table, there is a column corresponding to each element of the first string and a row for each element of the second string. Starting with the first column, a distance value is computed for each column and row pairing and stored in the respective column and row position. For example, if the distance between S1 (1), the first character of S1, and S2 (4), the fourth character of S2, is 2, then the value of the table position (1,4)=2.

Once all the calculations have been computed for the first column, distance values for the second column are computed. In the second column, a distance value is computed between each column and row pairing. This distance value is added to the minimum distance computed from the previous column in order to compute an accumulated distance. The accumulated distance is stored in the respective row and column position. The respective row and column position also stores a pointer to the position of the minimum distance computed in the previous column (and used in the accumulated distance computation). Thus, each element of the table contains a local minimum distance value and a pointer to the previous step in the path to computing this distance value.

The accumulated distance computation is repeated for each successive column in the table. Upon completing the computation of the accumulated distance for the last column, the minimum accumulated distance value in the last column is selected. The row and column position of this minimum value correspond to the last in the sequence of aligned peaks in the audio and video signals.

The pointer stored with the selected minimum accumulated distance value is then followed back to the minimum distance of the previous column. The row and column position of this table element correspond to the second to last aligned audio and video peaks. The pointer associated with the second to last table element is then followed to the third to last column to find the third to last aligned audio and video peaks. This process is repeated until a complete path back to the first column has been found. Each step in the path represents a mapping of audio time and video time with the best alignment of peaks and troughs of the audio and video signals. In this manner, this embodiment finds the optimal alignment between audio and video peaks.

In an alternate embodiment, Peak Alignment is used to align the audio and video peaks. First, the desired number of peaks is chosen in advance. This number may be determined by the user, or predetermined by the method. A threshold value for the video signal is determined, such that the desired number of peaks in the novelty measurement of the video signal are located above the threshold value. If there are too many peaks, then the threshold value is raised. Conversely, the threshold value is lowered if there are not enough peaks above the threshold value. A threshold value is similarly determined for the novelty measurement of the baseline audio signal.

If the proper number of peaks cannot be located by adjusting the threshold value, for example if two peaks have the exact same value, then heuristics can be used to obtain the proper number of peaks. In an embodiment, if two peaks are very close together, then the method will pick one peak and ignore the other. Alternatively, the method may pick peaks to maximize the distance between peaks, or to make the average distance between peaks closer to a predetermined desirable value.

Figure 5:
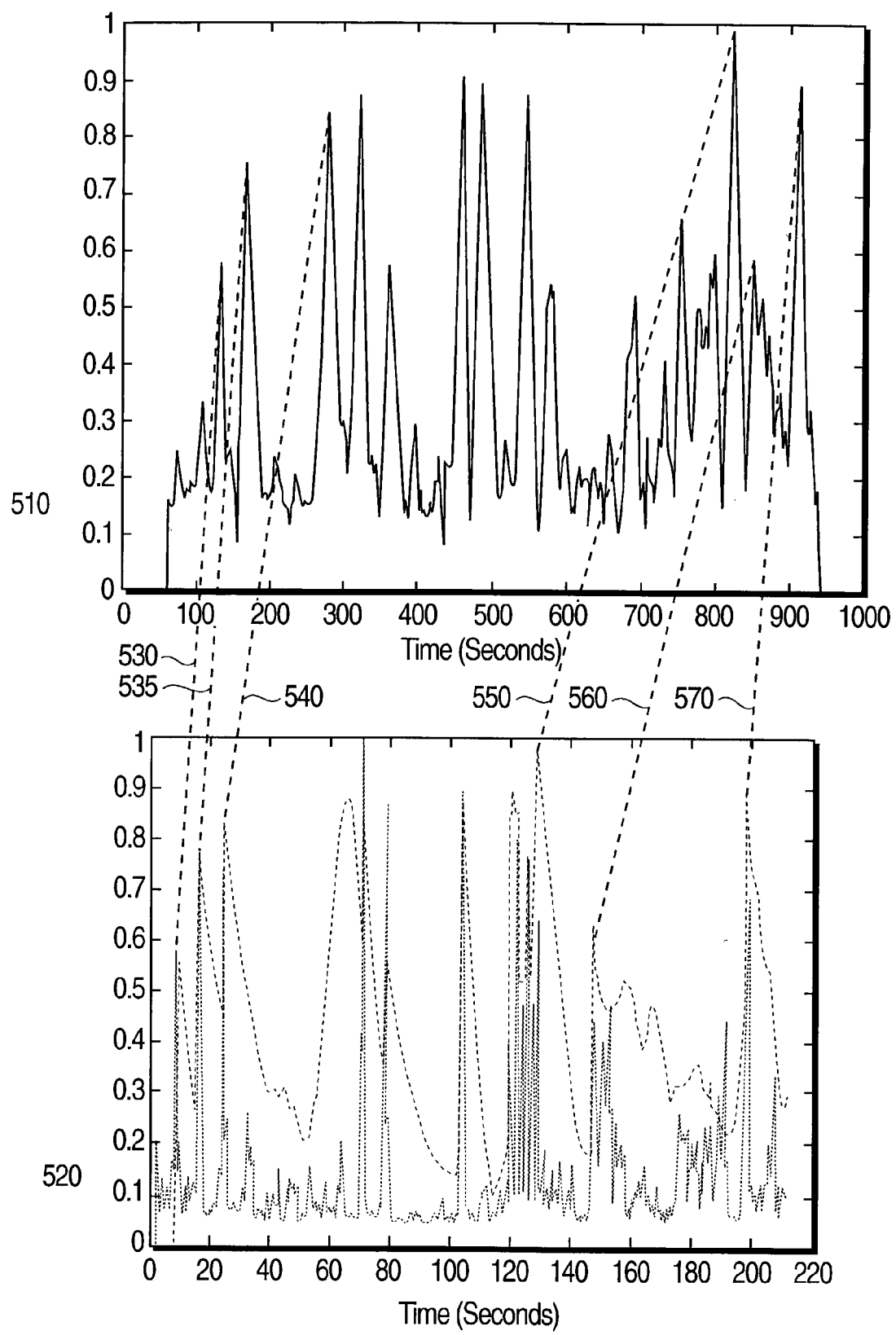
FIG. 5 illustrates a method for automatically synchronizing audio and video using peak alignment according to an embodiment of the present invention.

Once the threshold value has been set, there will be an equal number of audio and video peaks. The audio and video peaks are then matched one to one, in sequential order, in order to select the optimal alignment between audio and video. FIG. 5 shows the alignment of example audio and video signals using Peak Alignment. Chart 510 is the novelty measurement of an example video signal. Chart 520 is the novelty measurement of an example baseline audio signal. The different time scales of each chart show that the video signal is being aligned with a relatively shorter audio signal. The alignment of the audio and video peaks is shown by the dotted lines 530, 535, 540, 550, 560, and 570.

In an alternate embodiment, Tempo Mapping is used to align the video with the baseline audio. This embodiment is useful when the baseline audio contains music with a distinctive tempo or beat, such as most popular music. The music for the baseline audio is analyzed to detect beats at every moment in the music. The detected beats are used to derive an instantaneous tempo, the reciprocal of which is the time per beat. The time per beat is used, either alone or with the time signature of the music in order to find a minimum shot duration.

Figure 6:
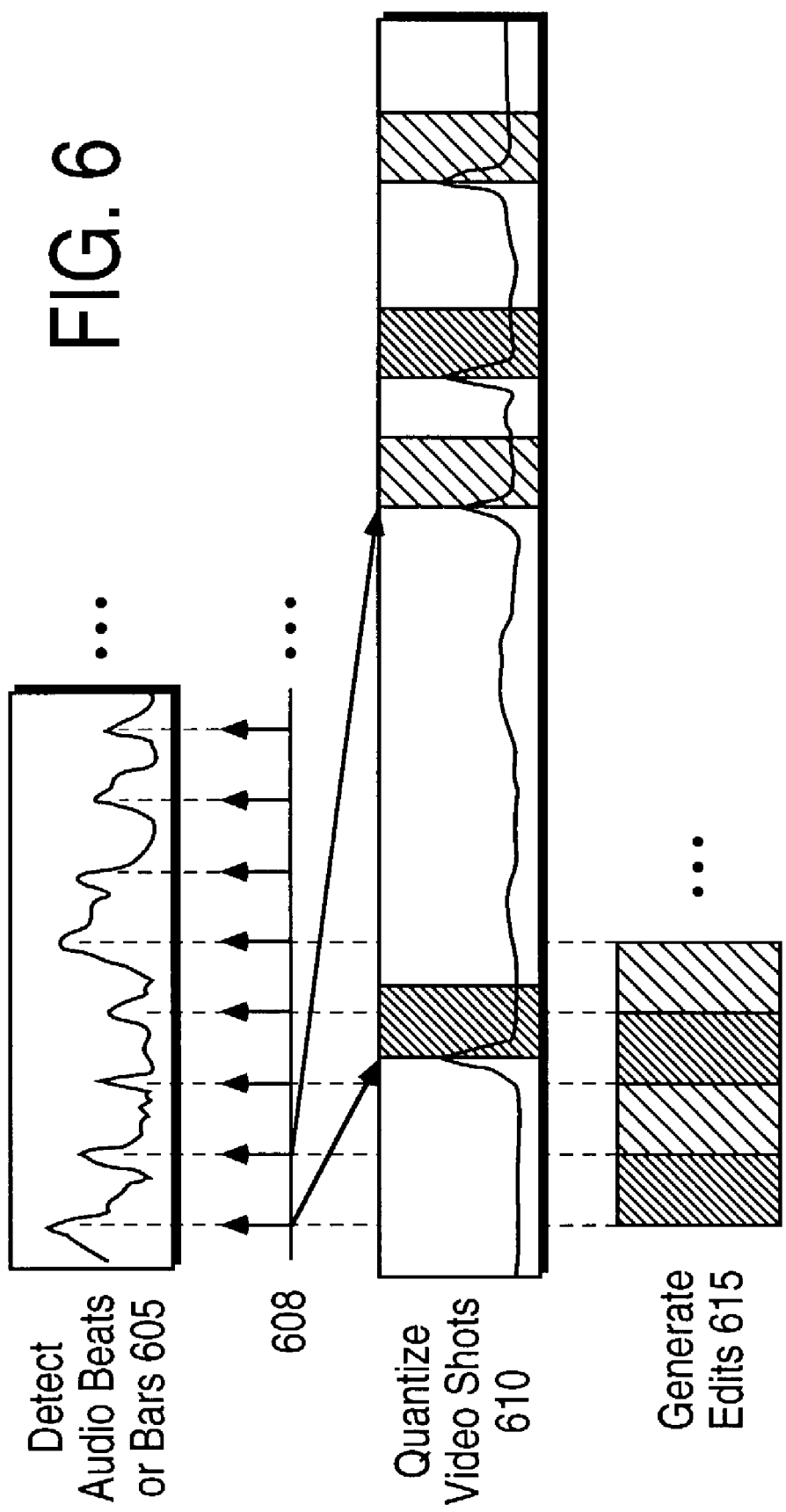
FIG. 6 illustrates a method of automatically synchronizing audio and video using tempo detection according to an embodiment of the present invention.

As shown in FIG. 6, the beat measurement of the baseline audio signal 605 is overlaid with a template of shot boundaries 608. The peaks of the beat measurement 605 align with the shot boundaries of template 608. In an embodiment, the template is based on a musical bar or measure, which contains a fixed number of beats.

For each detected beat or bar, a video shot is assigned. Prior to matching, some shots are discarded so that the number of video shots meets the number of detected beats or bars in the baseline audio. In an embodiment, users may specify the number of shots for setting a mood in the final music video. Alternatively, heuristics may be applied to avoid shots that are too long or too short.

For each selected video shot, the sum of the base durations of the aligned beats is computed. Then, a portion of the shot which has the equal length with the sum is extracted. Concatenating the video segments yields a video digest synchronized to the chosen music. Using this method, shots in a resulting video are long if the base duration of each beat is long, for example in a slow ballad. On the other hand, shorter shots result from fast paced popular music, creating an editing style similar to the typical music video.

Figure 7:
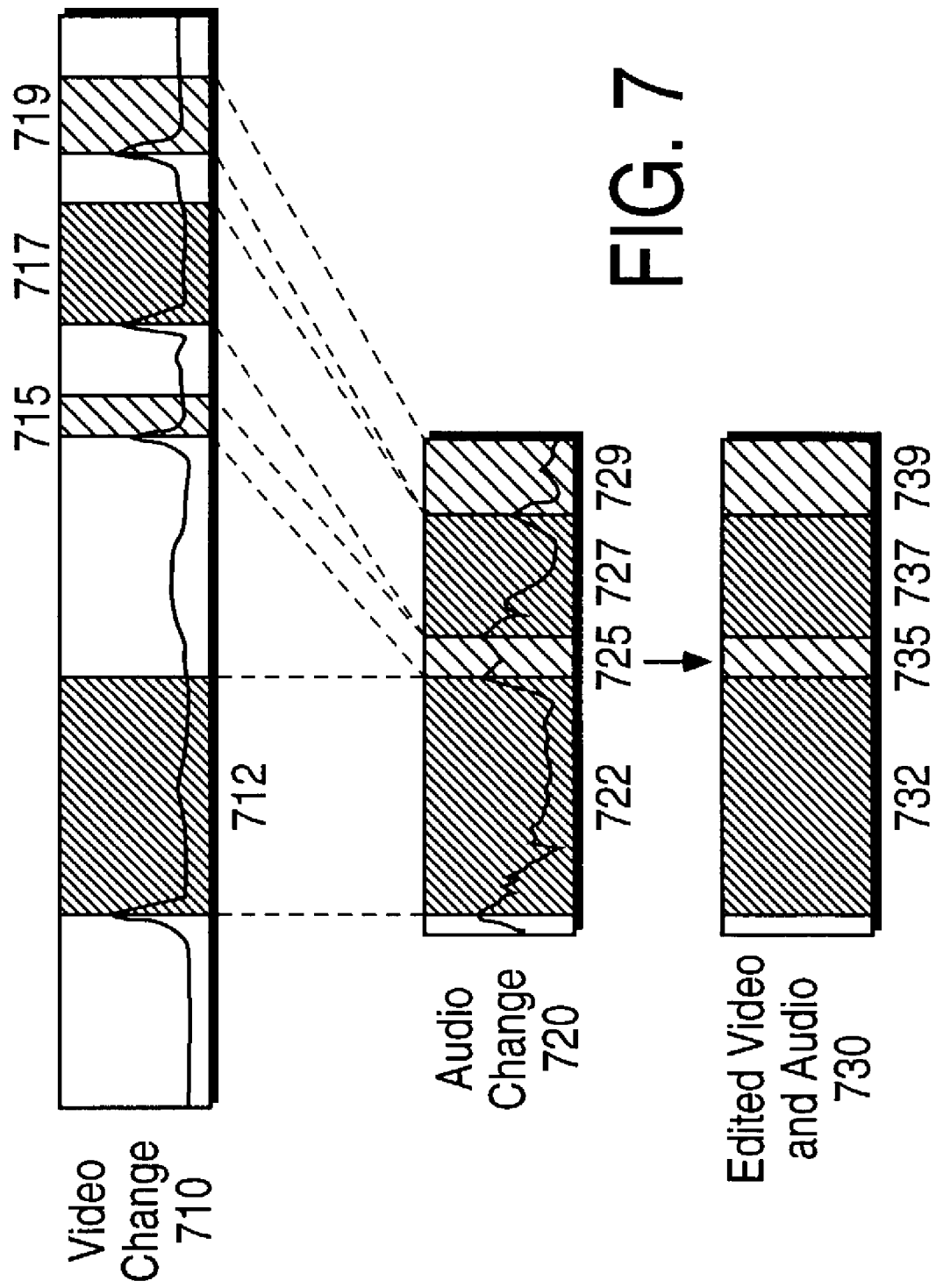
FIG. 7 illustrates a method for automatically editing video to synchronize transition points of the video signal with transition points in the audio signal according to an embodiment of the present invention.

Once the peaks of the audio and video are aligned in block 135, the video is edited in block 140 and merged with the baseline audio in block 150. FIG. 7 illustrates the method of editing and merging in more detail. The peaks of example video signal 710 are aligned with the peaks of example baseline audio signal 720. The region between the first two peaks of audio signal 720 define audio segment 722. Video segment 712, which begins with the first aligned video peak of video signal 710, is selected. Video segment 712 is of equal length as audio segment 722. Video signal 712 and audio segment 722 are merged into music video segment 732.

The region between the second and third peaks of the baseline audio signal 720 define audio segment 725. Audio segment 725 is aligned with video segment 715. Audio segment 725 is merged with video segment 715 to produce music video segment 735. It should be noted that audio segments 722 and 725 are contiguous, while video segments 712 and 715 are not. This is desirable in that jumps or cuts in video are generally accepted as a normal cinematic technique, while jumps in audio are not. As discussed above, excess video is removed from the video segment in order to match the length of the aligned audio segment. This may be done by truncating from the end of the video segment, as shown in FIG. 7, or by the use of a suitability measurement to determine the optimal portion of the video segment.

The merging of baseline audio and video segments is continued for video segments 717 and 719 and baseline audio segments 727 and 729, respectively, in order to produce music video segments 737 and 739. Together, the music video segments comprise the completed music video 730.

During the merging of the audio and video segments, any audio soundtrack previously associated with the video signal is discarded. In an alternate embodiment, the baseline audio is mixed with the audio soundtrack associated with the video source. This embodiment is desirable when the audio soundtrack contains speech or narration which should be preserved. The baseline audio may be mixed with the audio soundtrack at a fixed level, or, using automatic gain control, the baseline audio is reduced in volume only when there is speech or dialog in the audio soundtrack. In this embodiment, the music is primarily heard when people are not speaking and can cover background noise or other imperfections.

The completed music video is output at block 160 of FIG. 1. This video may be output as a digital video data file, in a similar format used for the video signal input, or may be converted to an analog video signal for display by the user and/or analog video recording. The digital video file may be stored on a local digital information storage medium, or alternatively, stored on a remote digital information storage medium accessible via a local or wide area computer network.

In an alternate embodiment, the video signal is a sequence of still images. In this embodiment, the detection of transition points in the video is trivial. Each still image is treated as a separate video shot. The detection of transition points in the audio signal is carried out as discussed above. The transition points in the audio signal define a set of audio segments. Each still image is assigned to a different segment of the audio signal. In the resulting music video, each still image is displayed for the duration of its assigned audio segment. This creates the effect of paging through a photo album in time with the music.

Figure 8:
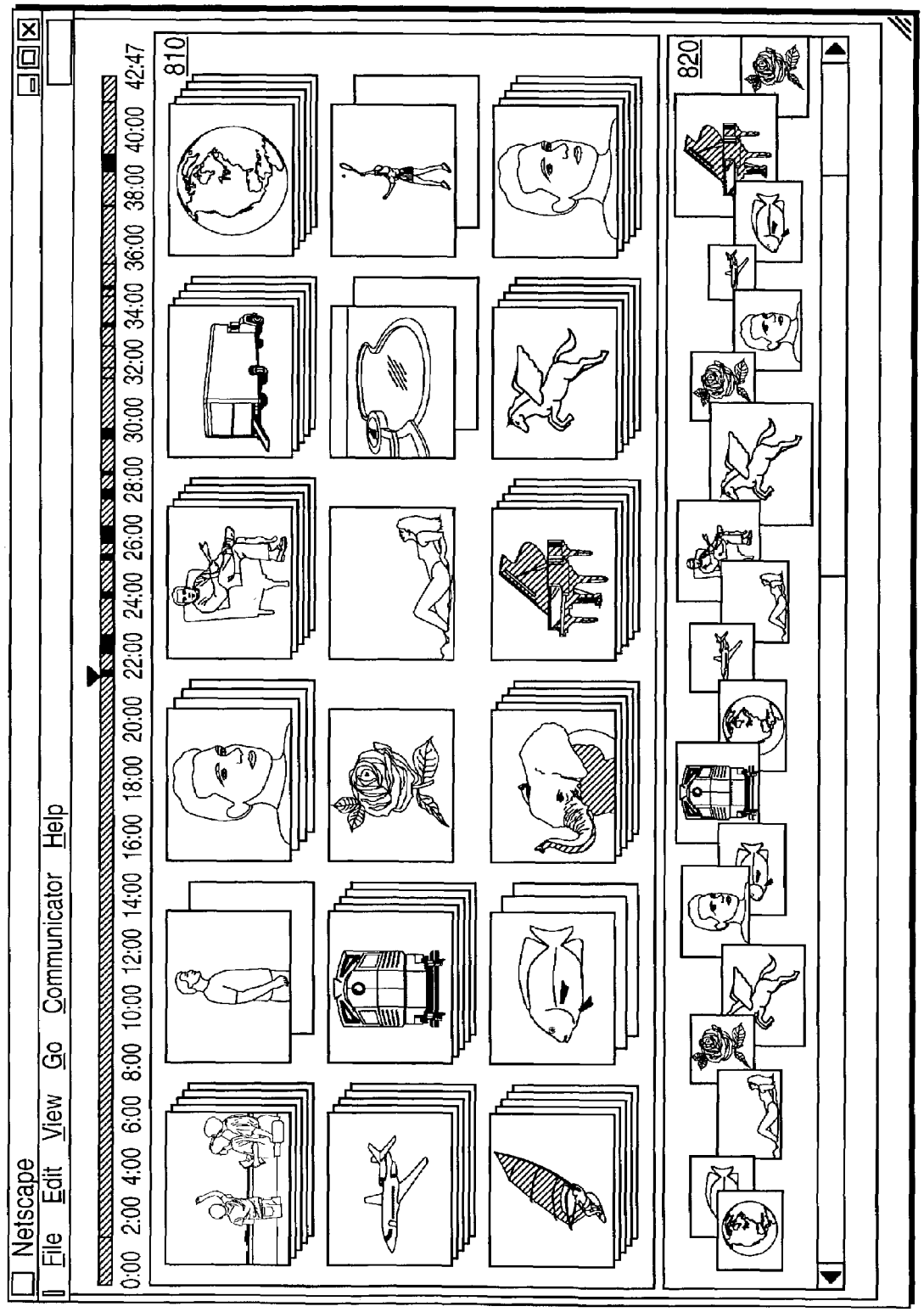
FIG. 8 illustrates a graphical user interface for user shot selection according to an embodiment of the present invention.

In an alternate embodiment, the user may select shots to be included in the final music video. This may be done, in an embodiment, through a graphical user interface. FIG. 8 shows an example of a graphical user interface used for shot selection. The interface contains a top display 810. The top display contains images representing raw video segments. The image representing a shot may be a keyframe from the video segment. In an embodiment, the video segments are produced according to the techniques described above. Alternatively, shots are clustered according to their color histograms and grouped on screen by similarity or by time recorded. Other distance measures may be employed to group raw video segments. When the user clicks on a group of video segments, all of the segments in the group are displayed separately, allowing the user to select an individual video segment.

In order to select a video segment for inclusion into the final music video, the user selects the raw video segment in top display 810 and drags it into bottom display 820. The bottom display 820 represents a time line of the final music video. By positioning the raw video segment at various points on the timeline, the user is able to change the order of video segments in the final music video.

Once the user has completed the shot selection, this embodiment automatically aligns and edits the video as discussed above. If the user has selected an insufficient quantity of video, this embodiment may warn the user or alternatively use unselected video segments to fill in any gaps. Unlike other systems for editing video, the user does not need to enter precise shot boundaries for the selected video segments. This embodiment uses the techniques described above to automatically determine the in and out points for each clip to be included in the final music video.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A method for automatically producing a music video, comprising:
   receiving an audio signal in which an audio framework is present;
   receiving a video signal;
   detecting transition points in the audio signal and the video signal;
   aligning in time the video signal with the audio signal, wherein the video signal is aligned with the audio signal based on the transition points and audio signal framework;
   editing and truncating the aligned video signal; and
   merging the aligned video signal with the audio signal to form a music video signal.

2. The method of claim 1, wherein the step of aligning comprises:
   forming a video segment comprising a portion of the video signal based upon the transition points in the video signal; and
   aligning the video segment with a transition point in the audio signal.

3. The method of claim 2, wherein:
   a boundary of the video segment is defined by a transition point in the video signal; and the boundary of the video segment is aligned with the transition point in the audio signal.

4. The method of claim 3, wherein:
the boundary is located at beginning of video segment.

5. The method of claim 2, wherein:
a first and second transition in the audio signal define an audio segment having a length; and
the video segment has a video segment length, wherein the video segment length is reduced to equal the length of the audio segment.

6. The method of claim 5, wherein:
the video segment is truncated in order to equal the length of the audio segment.

7. The method of claim 5, wherein:
the video segment is evaluated using a suitability measurement in order to define a portion of the video segment equal to the length of the audio segment.

8. The method of claim 1, wherein the step of detecting comprises:
parameterizing the audio and video signals in order to form corresponding sets of feature vectors; and
evaluating the sets of feature vectors in order to determine the location of transitions in the corresponding signals.

9. The method of claim 8, wherein:
the parameterization includes a histogram.

10. The method of claim 8, wherein:
the parameterization includes a frequency domain transform.

11. The method of claim 8, wherein the step of evaluating comprises:
constructing a self-similarity matrix based upon a distance metric for a set of feature vectors; and
extracting structure from the self-similarity matrix via a kernel correlation.

12. The method of claim 11, wherein:
the distance metric is the Euclidean distance between feature vectors.

13. The method of claim 11, wherein:
the distance metric is the cosine of the angle between feature vectors.

14. The method of claim 11, wherein:
the distance metric is the Karhunen-Loeve distance.

15. The method of claim 8, wherein:
the evaluation of sets of feature vectors includes determining a difference between adjacent feature vectors.

16. The method of claim 8, wherein:
the evaluation of sets of feature vectors includes determining an accumulated difference between a plurality of feature vectors.

17. The method of claim 8, wherein:
the evaluation of sets of feature vectors includes comparing the time period between a previous transition and a feature vector in order to determine the location of a transition.

18. The method of claim 1, wherein the step of aligning in time comprises:
aligning the detected transitions in the audio signal with the detected transitions in the video signal using dynamic programming.

19. The method of claim 1, wherein the step of aligning in time comprises:
aligning the detected transitions in the audio signal with the detected transitions in the video signal using the tempo of the audio signal.

20. The method of claim 1, wherein the step of aligning in time comprises:
adjusting a transition detection threshold to produce a specific number of transitions corresponding to the desired number of video cuts; and
aligning the transitions of the audio signal with the transitions of the video signal.

21. The method of claim 11, wherein:
the width of the kernel determines the duration of transitions detected.

22. The method of claim 1, wherein the step of merging comprises:
combining the audio signal with a second audio signal associated with the video signal, wherein the audio signal is reduced in volume during periods of speech on the second audio signal.

23. The method of claim 1, wherein the step of aligning comprises:
receiving a user selection designating a video segment for inclusion in the music video signal.

* * * * *